(12) United States Patent
Walrond

(10) Patent No.: US 6,588,473 B1
(45) Date of Patent: Jul. 8, 2003

(54) SEGMENTED TIRE

(76) Inventor: Chesterfield E. Walrond, First Ave Accommodation Rd, Bush Hall, St Michael (BB)

( * ) Notice: Subject to any disclaimer, the term of this patent is extended or adjusted under 35 U.S.C. 154(b) by 83 days.

(21) Appl. No.: 09/785,135

(22) Filed: Feb. 16, 2001

(51) Int. Cl.[7] ................................................. B60C 5/24
(52) U.S. Cl. .................................. 152/331.1; 152/333.1
(58) Field of Search ........................... 152/331.1, 333.1, 152/334.1, 335.1, 339.1, 344.1

(56) References Cited

U.S. PATENT DOCUMENTS

| | | | | |
|---|---|---|---|---|
| 754,645 | A | * 3/1904 | Dupont | 152/331.1 |
| 1,015,599 | A | * 1/1912 | Vaughan | 152/338.1 |
| 1,086,947 | A | * 2/1914 | Smith | 152/338.1 |
| 1,129,807 | A | 2/1915 | Livingston | |
| 1,392,853 | A | * 10/1921 | Ryder | 152/338.1 |
| 1,957,384 | A | * 5/1934 | Briquet | 152/338.1 |
| 2,155,105 | A | * 4/1939 | Thiele | 152/333.1 |
| 2,299,243 | A | 10/1942 | Mayer, Sr. | |
| 2,413,915 | A | * 1/1947 | Frankel | 137/223 |
| 2,493,731 | A | * 1/1950 | Watter | 152/333.1 |
| 4,054,169 | A | * 10/1977 | Devienne et al. | 137/517 |
| 4,570,691 | A | * 2/1986 | Martus | 137/223 |
| 4,884,609 | A | 12/1989 | Ho | |
| D317,741 | S | 6/1991 | Kuroda | |
| 5,693,161 | A | 12/1997 | Ho | |

* cited by examiner

Primary Examiner—Michael W. Ball
Assistant Examiner—Justin Fischer

(57) ABSTRACT

A segmented tire for resisting complete deflation after being punctured. The segmented tire includes a tire having an inside wall and an outside wall. An outer peripheral wall extends between and is integrally coupled to an outer edge of the inside wall and the outside wall. Each of the inside and outside walls has a generally circular shape and has a central area having a circular opening therein. An inner peripheral wall extends between and is integrally coupled to an edge of each of the openings such that a generally airtight interior of the tire is defined. Each of a plurality of intermediate walls is positioned within the tire. Each of the intermediate walls extends between and is attached to the inner peripheral wall and the outer peripheral wall such that the intermediate walls radiate outwardly from the inner peripheral wall to the outer peripheral wall. Each of the intermediate walls extends between the inside wall and the outside wall such that each of a plurality of substantially air-tight chambers is defined between a pair of adjacent intermediate walls. The tire and the intermediate walls comprise an elastonmeric material.

3 Claims, 4 Drawing Sheets

SEGMENTED TIRE

BACKGROUND OF THE INVENTION

1. Field of the Invention

The present invention relates to tires and more particularly pertains to a new segmented tire for resisting complete deflation after being punctured.

2. Description of the Prior Art

The use of tires is known in the prior art. More specifically, tires heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,054,169; U.S. Pat. No. 1,129,807; U.S. Pat. No. 5,693,161; U.S. Pat. No. 2,299,243; U.S. Des. Pat. No. 317,741; and U.S. Pat. No. 4,884,609.

While these devices fulfill their respective, particular objectives and requirements, the aforementioned patents do not disclose a new segmented tire. The inventive device includes a tire having an inside wall and an outside wall. An outer peripheral wall extends between and is integrally coupled to an outer edge of the inside wall and the outside wall. Each of the inside and outside walls has a generally circular shape and has a central area having a circular opening therein. An inner peripheral wall extends between and is integrally coupled to an edge of each of the openings such that a generally airtight interior of the tire is defined. Each of a plurality of intermediate walls is positioned within the tire. Each of the intermediate walls extends between and is attached to the inner peripheral wall and the outer peripheral wall such that the intermediate walls radiate outwardly from the inner peripheral wall to the outer peripheral wall. Each of the intermediate walls extends between the inside wall and the outside wall such that each of a plurality of substantially air-tight chambers is defined between a pair of adjacent intermediate walls. The tire and the intermediate walls comprise an elastomeric material.

In these respects, the segmented tire according to the present invention substantially departs from the conventional concepts and designs of the prior art, and in so doing provides an apparatus primarily developed for the purpose of resisting complete deflation after being punctured.

SUMMARY OF THE INVENTION

In view of the foregoing disadvantages inherent in the known types of tires now present in the prior art, the present invention provides a new segmented tire construction wherein the same can be utilized for resisting complete deflation after being punctured.

The general purpose of the present invention, which will be described subsequently in greater detail, is to provide a new segmented tire apparatus and method which has many of the advantages of the tires mentioned heretofore and many novel features that result in a new segmented tire which is not anticipated, rendered obvious, suggested, or even implied by any of the prior art tires, either alone or in any combination thereof.

To attain this the present invention generally comprises a tire having an inside wall and an outside wall. An outer peripheral wall extends between and is integrally coupled to an outer edge of the inside wall and the outside wall. Each of the inside and outside walls has a generally circular shape and has a central area having a circular opening therein. An inner peripheral wall extends between and is integrally coupled to an edge of each of the openings such that a generally airtight interior of the tire is defined. Each of a plurality of intermediate walls is positioned within the tire. Each of the intermediate walls extends between and is attached to the inner peripheral wall and the outer peripheral wall such that the intermediate walls radiate outwardly from the inner peripheral wall to the outer peripheral wall. Each of the intermediate walls extends between the inside wall and the outside wall such that each of a plurality of substantially air-tight chambers is defined between a pair of adjacent intermediate walls. The tire and the intermediate walls comprise an elastomeric material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further the purpose of the foregoing abstract is to enable the U.S. Patent and Trademark Office and the public generally, and especially the scientists, engineers and practitioners in the art who are not familiar with patent or legal terms or phraseology to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new segmented tire apparatus and method which has many of the advantages of the tires mentioned heretofore and many novel features that result in a new segmented tire which is not anticipated, rendered obvious suggested, or even implied by any of the prior art tires, either alone or in any combination thereof.

It is another object of the present invention to provide a new segmented tire which may be easily and efficiently manufactured and marketed.

It is a further object of the present invention to provide a new segmented tire which is of a durable and reliable construction.

An even further object of the present invention is to provide a new segmented tire which is susceptible of a low cost of manufacture with regard to both materials and labor, and which accordingly is then susceptible of low prices of sale to the consuming public, thereby making such segmented tire economically available to the buying public.

Still yet another object of the present invention is to provide a new segmented tire which provides in the apparatuses and methods of the prior art some of the advantages thereof, while simultaneously overcoming some of the disadvantages normally associated therewith.

Still another object of the present invention is to provide a new segmented tire for resisting complete deflation after being punctured.

Yet another object of the present invention is to provide a new segmented tire which includes a tire having an inside wall and an outside wall. An outer peripheral wall extends between and is integrally coupled to an outer edge of the inside wall and the outside wall. Each of the inside and outside walls has a generally circular shape and has a central area having a circular opening therein. An inner peripheral wall extends between and is integrally coupled to an edge of each of the openings such that a generally airtight interior of the tire is defined. Each of a plurality of intermediate walls is positioned within the tire. Each of the intermediate walls extends between and is attached to the inner peripheral wall and the outer peripheral wall such that the intermediate walls radiate outwardly from the inner peripheral wall to the outer peripheral wall. Each of the intermediate walls extends between the inside wall and the outside wall such that each of a plurality of substantially air-tight chambers is defined between a pair of adjacent intermediate walls. The tire and the intermediate walls comprise an elastomeric material.

Still yet another object of the present invention is to provide a new segmented tire that has stop valves within the intermediate walls which allow air transfer between the chambers when the air pressure is relatively equal but close when a chamber has a sudden pressure drop.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
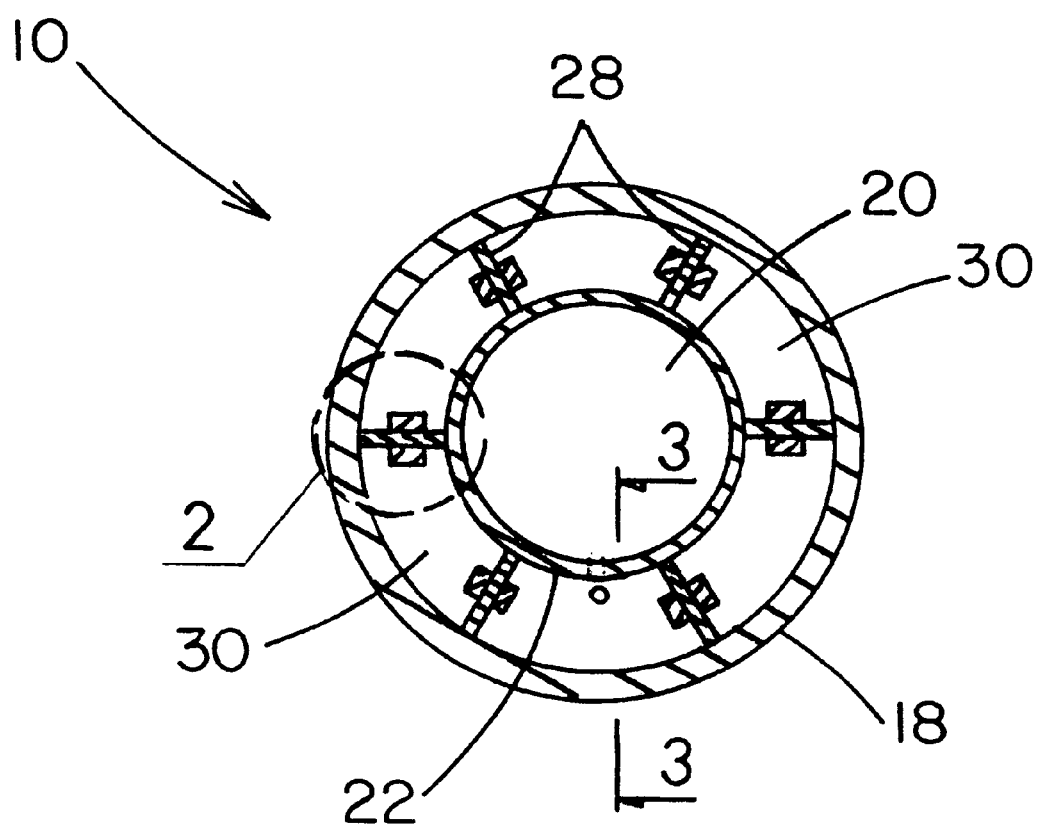
FIG. 1 is a schematic side cross-sectional view of a new segmented tire according to the present invention.

With reference now to the drawings, and in particular to FIGS. 1 through 4 thereof, a new segmented tire embodying the principles and concepts of the present invention and generally designated by the reference numeral 10 will be described.

Figure 2:
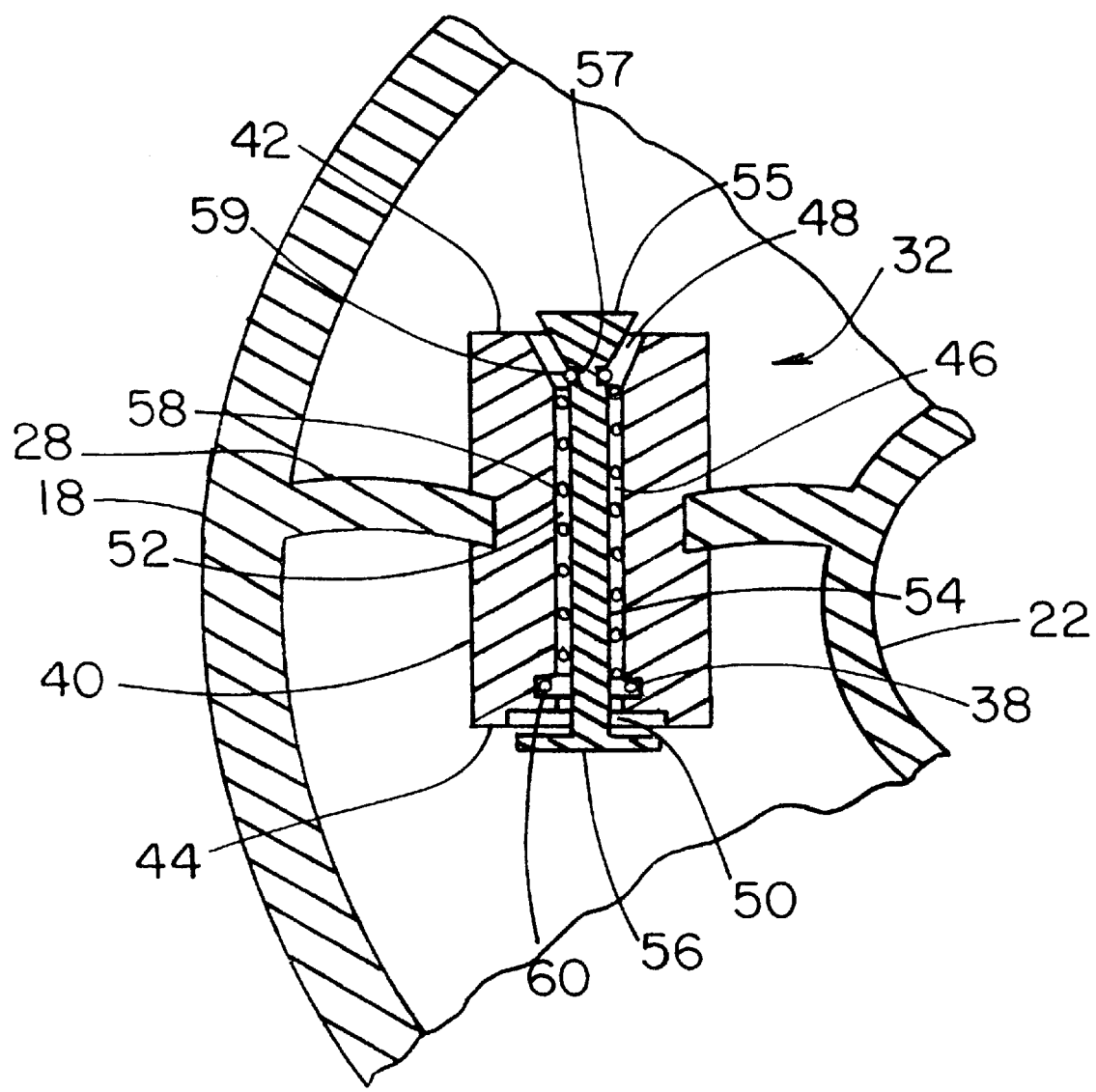
FIG. 2 is a schematic exploded view of circled area 2 shown FIG. 1 of the present invention.
Figure 3:
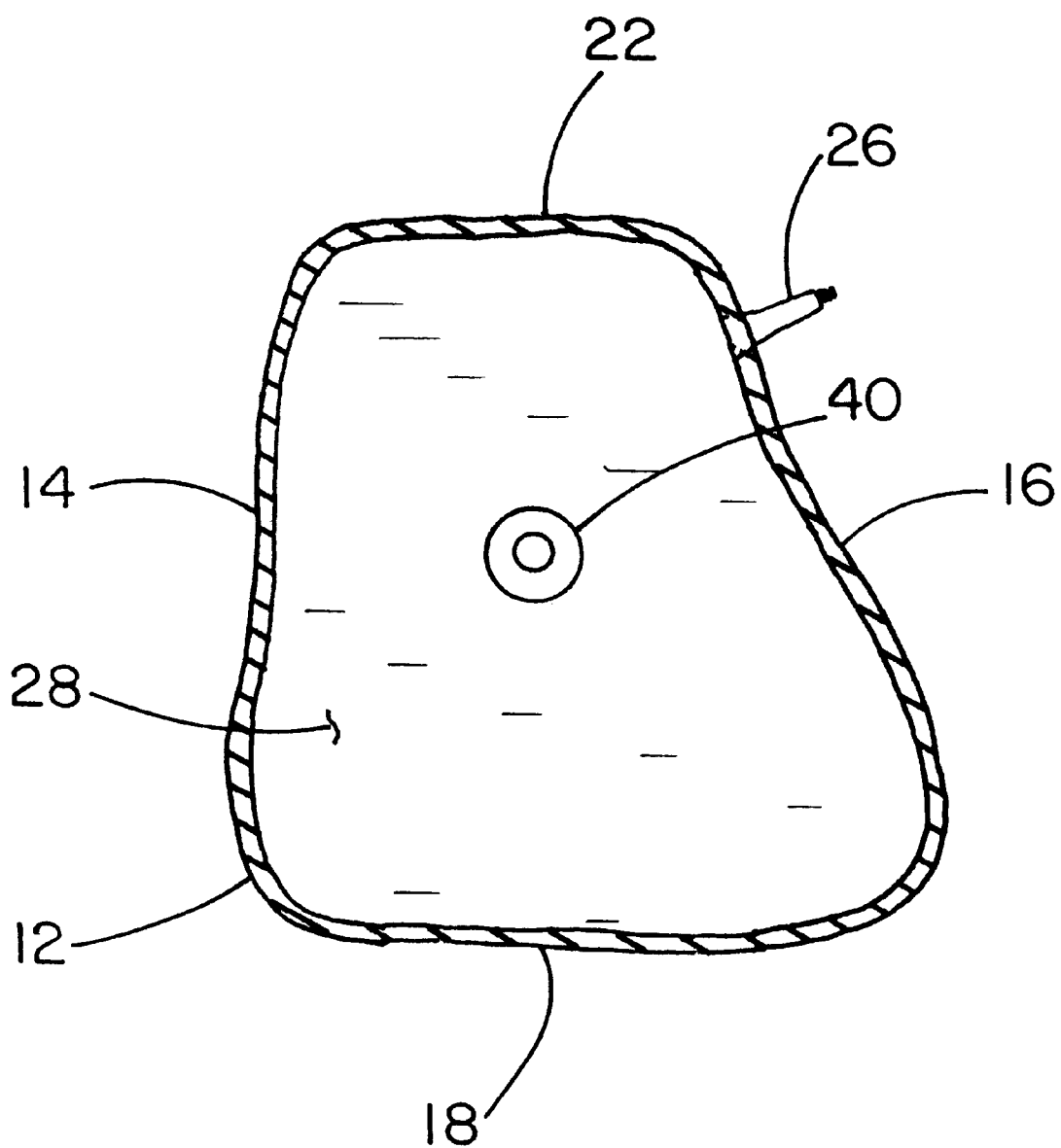
FIG. 3 is a schematic cross-sectional view taken along line 3—3 shown in FIG. 1 of the present invention.

As best illustrated in FIGS. 1 through 3, the preferred embodiment of the segmented tire 10 generally comprises a tire 12 having an inside wall 14 and an outside wall 16. An outer peripheral wall 18 extends between and is integrally coupled to an outer edge of the inside wall 14 and the outside wall 16. Each of the inside 14 and outside 16 walls has a generally circular shape and each has a central area having a circular opening 20 therein. An inner peripheral wall 22 extends between and is integrally coupled to an edge of each of the openings 20 such that a generally airtight interior of the tire 12 is defined.

An intake valve 26 is in communication with the interior of the tire and is mounted on the outside wall 14 of the tire 12. The intake valve 26 is a one-way air valve.

Each of a plurality of intermediate walls 28 is positioned within the tire 12 and each of the intermediate walls 28 extends between and is attached to the inner peripheral wall 22 and the outer peripheral wall 18 such that the intermediate walls 28 radiate outwardly from the inner peripheral wall 22 to the outer peripheral wall 18. Each of the intermediate walls 28 extends between the inside wall 14 and the outside wall 16 such that each of a plurality of substantially air-tight chambers 30 is defined between a pair of adjacent intermediate walls 28. The plurality of intermediate walls 28 ideally comprises six intermediate walls. Each of the intermediate walls 28 and the tire 12 comprise an elastomeric material.

Each of a plurality of stop valves 32 is positioned in one of the intermediate walls 28 and is in communication with a pair of adjacently positioned chambers 30. Each of the stop valves 32 is adapted for closing when a first of the chambers 30 associated with a stop valve 32 has an air pressure greater than a second of the chambers 30 associated with the same stop valve 32.

Each of the stop valves 32 includes a tubular member 40 having a first end 42 and a second end 44. The tubular member 40 extends through one of the intermediate walls 28 such that each of the ends 42, 44 of the tubular member 40 is positioned in a different chamber 32. The tubular member 40 has a bore 46 extending therethrough and through the first 42 and second 44 ends. A peripheral wall of the bore has a channel 38 therein extending around the bore 46 and positioned nearer the second end 44 than the first end 42. A proximal portion 48 of the bore 46 positioned adjacent to the first end 42 of the tubular member 40 and a distal portion 50 of the bore 46 positioned adjacent to the second end 44 of the tubular member 40 each have a width greater than a width of a middle portion 52 of the bore 46.

A pin 54 is positioned in the bore 46 and has a length greater than a length of the bore 46 and a width smaller than the middle portion 52 of the bore 46. The pin 54 has a pair of bulbous ends 56. Each of the bulbous ends 55, 56 has a diameter wider than the width of the middle portion 52 of the bore 46. A first bulbous end 55 may be removably positioned in the proximal portion 48 of the bore 46 and a second bulbous end 56 may be removably positioned in the distal portion 50 of the bore 46. The pin 54 has a slot 57 therein positioned generally adjacent to the first bulbous end 55.

A biasing means 58 biases the bulbous ends 55, 56 outward of the bore 46. The biasing means 58 has a first end 59 positioned in the slot 57 and a second end 60 positioned in the channel 38. The biasing means 58 is resiliently flexible. The biasing means 58 ideally comprises a spring wound about the pin 54.

Figure 4:
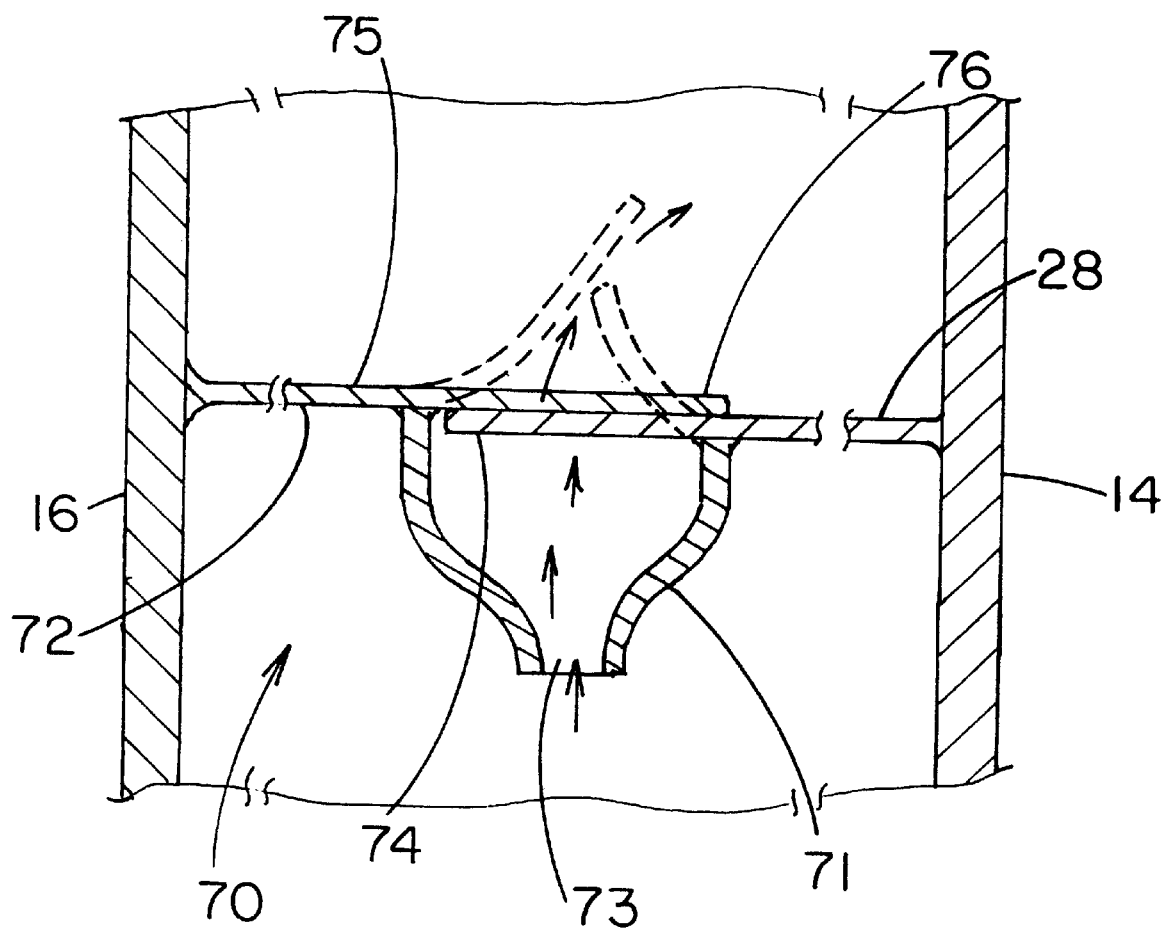
FIG. 4 is a schematic cross-sectional view of the second embodiment of the present invention.

A second embodiment is shown in FIG. 4 and includes each stop valves 70 adapted for allowing air-flow in a first direction only. The stop valves 70 in the second embodiment include a cylindrical member 71 attached to and extending away from a first side 72 of an associated intermediate wall 28. The cylindrical member 71 has a hole 73 extending therethrough and extending through the associated intermediate wall 28. A first flap 74 is attached to a second side 75 of the associated intermediate wall 28 and extends over the hole 73. A second flap 76 is attached to the second side 75 of the associated intermediate wall 28 and extends over the first flap 74 wherein the first 74 and second 76 flaps are positioned on opposite sides of the hole 73. Ideally, every other chamber 30 has a pair of cylindrical members 71 extending toward each other.

In use, when a chamber in the first embodiment is punctured, pressure is lost in that chamber. The stop valves in chambers adjacent to the punctured chamber are closed when air escaping from them into the punctured chambers forces the pins toward the punctured chamber so that the bulbous ends plug the bores. This prevents the tire from completely deflating. The stop valves in the second embodiment only allow air to travel in a first direction, thus should a chamber be punctured, air can only come from an adjacent chamber so that the tire deflates slowly or only partially depending on the positioning of the stop chambers.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A blow-out resistant tire for a vehicle comprising:

a tire having an inside wall and an outside wall, an outer peripheral wall extending between and being integrally coupled to an outer edge of said inside wall and said outside wall, each of said inside and outside walls having a generally circular shape and having a central area having a circular opening therein, an inner peripheral wall extending between and being integrally coupled to an edge of each of said openings such that a generally airtight interior of said tire is defined;

an intake valve being in communication with said interior of said tire and being mounted on said outside wall of said tire said intake valve being a one-way air valve;

a plurality of intermediate walls being positioned within said tire, each of said intermediate walls extending between and being attached to said inner peripheral wall and said outer peripheral wall such that said intermediate walls radiate outwardly from said inner peripheral wall to said outer peripheral wall, each of said intermediate walls extending between said inside wall and said outside wall such that each of a plurality of substantially air-tight chambers is defined between a pair of adjacent intermediate walls, said plurality of intermediate walls comprising six intermediate walls, each of said intermediate walls and said tire comprising an elastomeric material;

a plurality of stop valves each being positioned in one of said intermediate walls and being in communication with a pair of adjacently positioned chambers, each of said stop valves being adapted for closing when a first of the chambers associated with the stop valve has an air pressure greater than a second of the chambers associated with the stop valve, each of said stop valves comprising;

a tubular member having a first end and a second end, said tubular member extending through one of said intermediate walls such that each of said ends of said tubular member is positioned in a different chamber, said tubular member having a bore extending therethrough and through said first and second ends, a peripheral wall of said bore having a channel therein extending around said bore and being positioned nearer said second end than said first end of said tubular member, a proximal portion of said bore positioned adjacent to said first end of said tubular member and a distal portion of said bore positioned adjacent to said second end of said tubular member each having a width greater than a width of a middle portion of said bore;

a pin being positioned in said bore and having a length greater than a length of said bore and a width smaller than said middle portion of said bore, said pin having a pair of bulbous ends, each of said bulbous ends each having a diameter wider than the width of said middle portion of said bore, wherein a first bulbous end may be removably positioned in said proximal portion of said bore and a second bulbous end may be removably positioned in said distal portion of said bore, said pin having a slot therein positioned generally adjacent to said first bulbous end;

a biasing means for biasing said bulbous ends outward of said bore, said biasing means having a first end positioned in said slot and a second end positioned in said channel such that said channel of said peripheral wall of said bore inhibits said biasing means from slipping within said bore and failing to bias said pin, said biasing means being resiliently flexible, said biasing means comprising a spring wound about said pin.

2. A blow-out resistant tire for a vehicle comprising:

a tire having an inside wall and an outside wall, an outer peripheral wall extending between and being integrally coupled to an outer edge of said inside wall and said outside wall, each of said inside and outside walls having a generally circular shape and having a central area having a circular opening therein, an inner peripheral wall extending between and being integrally coupled to an edge of each of said openings such that a generally airtight interior of said tire is defined;

a plurality of intermediate walls being positioned within said tire, each of said intermediate walls extending between and being attached to said inner peripheral wall and said outer peripheral wall such that said intermediate walls radiate outwardly from said inner peripheral wall to said outer peripheral wall, each of said intermediate walls extending between said inside wall and said outside wall such that each of a plurality of substantially air-tight chambers is defined between a pair of adjacent intermediate walls, said tire and said intermediate walls comprising an elastomeric material;

an intake valve being in communication with said interior of said tire and being mounted on said outside wall of said tire, said intake valve being a one-way air valve;

a plurality of stop valves each being positioned in one of said intermediate walls and being in communication with a pair of adjacently positioned chambers, each of said stop valves being adapted allowing air-flow in a first direction; and each of said stop valves comprising a cylindrical member attached to and extending away from a first side of an associated intermediate wall, said cylindrical member having a hole extending therethrough and extending through said associated intermediate wall, a first flap being attached to a second side of said associated intermediate wall and extending over said hole, a second flap being attached to said second side of said associated intermediate wall and extending over said first flap wherein said first and second flaps are positioned on opposite sides of said hole, said first flap presses said second flap over said hole of said cylindrical member for inhibiting air-flow in a second direction when one of said chambers decompresses.

3. The blow-out resistant tire as in claim 2, wherein said plurality of intermediate walls comprises six intermediate walls.

\* \* \* \* \*